May 24, 1955     J. G. LINDEMAN ET AL     2,708,906
POSITION CONTROL MEANS FOR HYDRAULIC MECHANISM
Filed Jan. 21, 1953     4 Sheets-Sheet 1
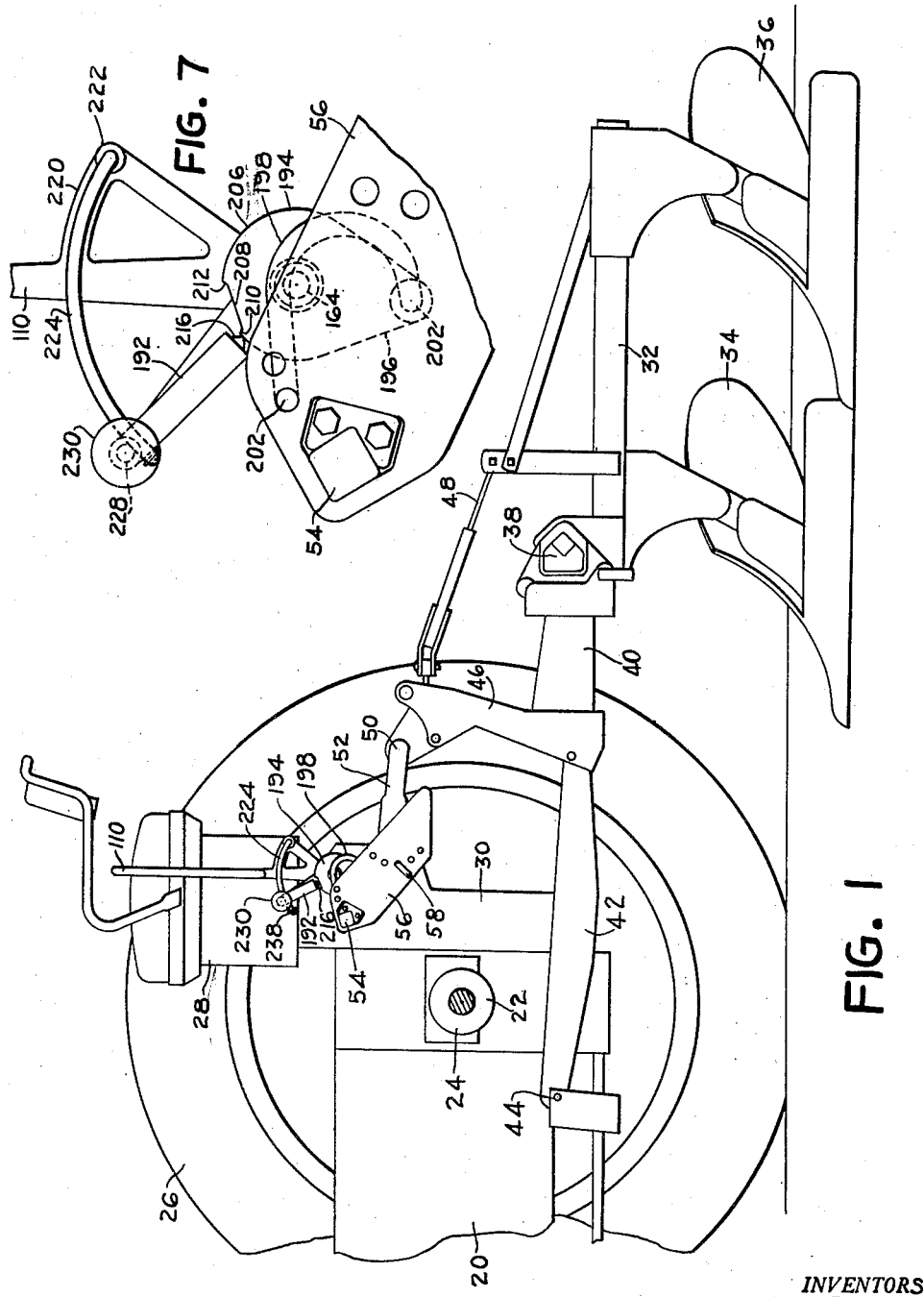
INVENTORS
J.G. LINDEMAN &
R.D. KREHBIEL
ATTORNEYS

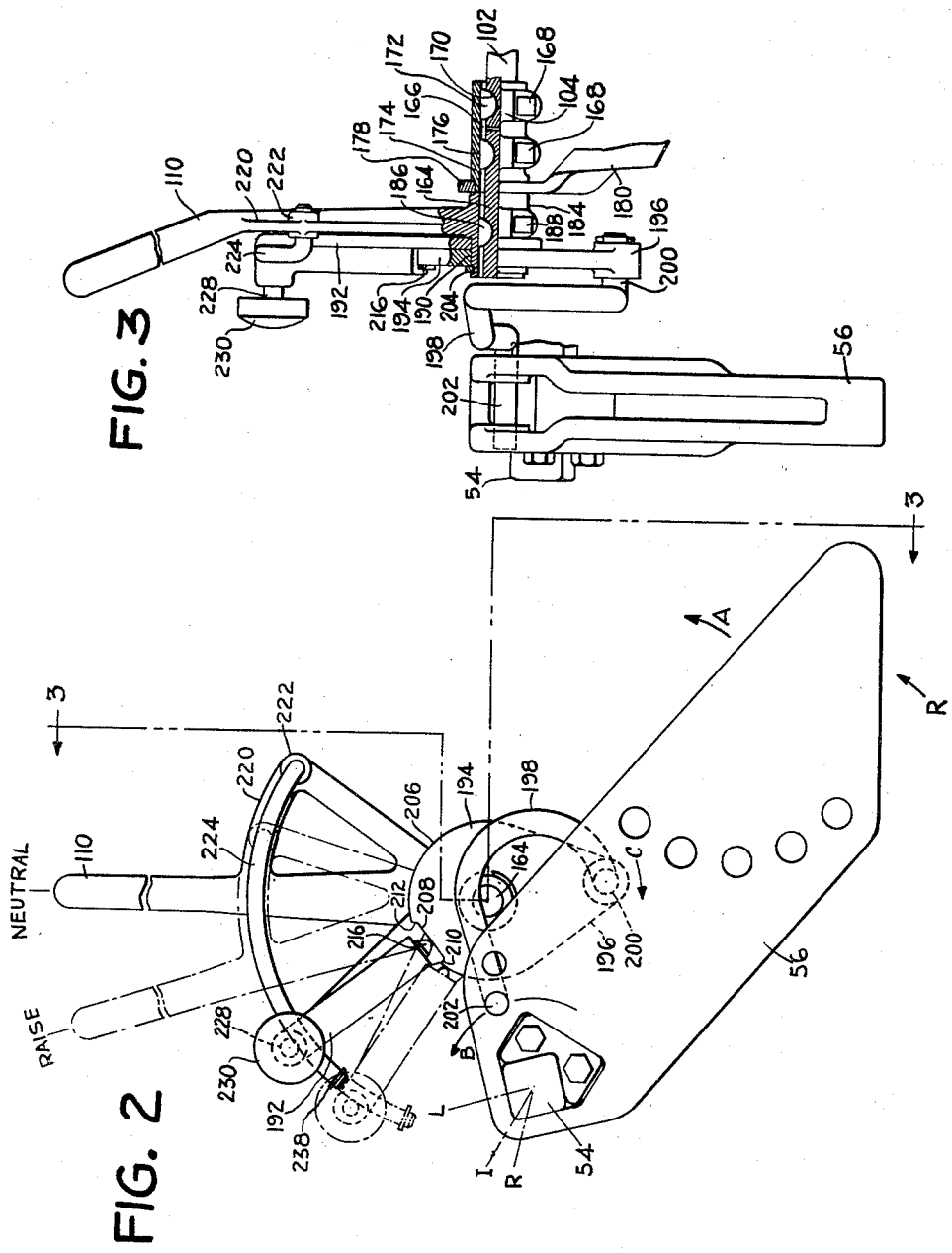

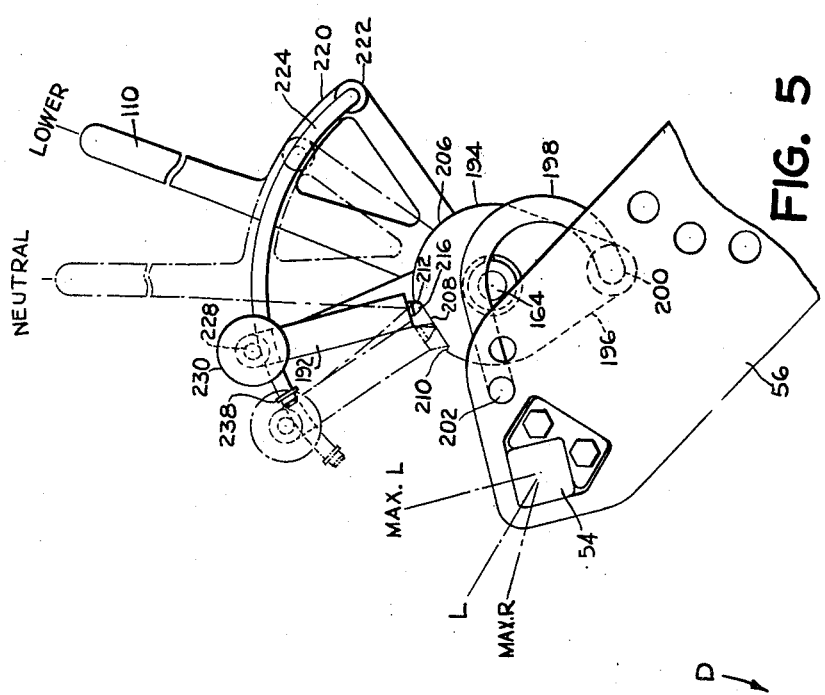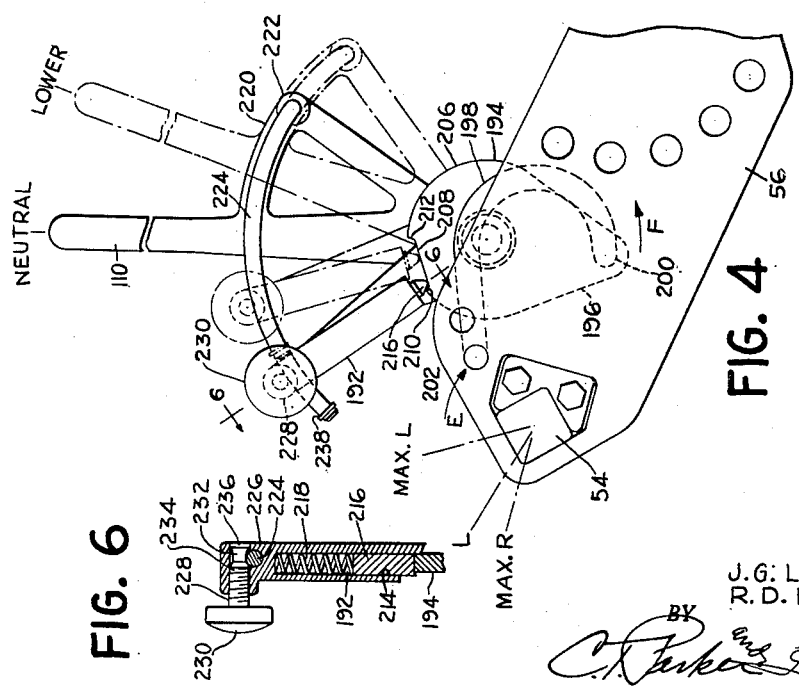

May 24, 1955
J. G. LINDEMAN ET AL
2,708,906
POSITION CONTROL MEANS FOR HYDRAULIC MECHANISM
Filed Jan. 21, 1953
4 Sheets-Sheet 4
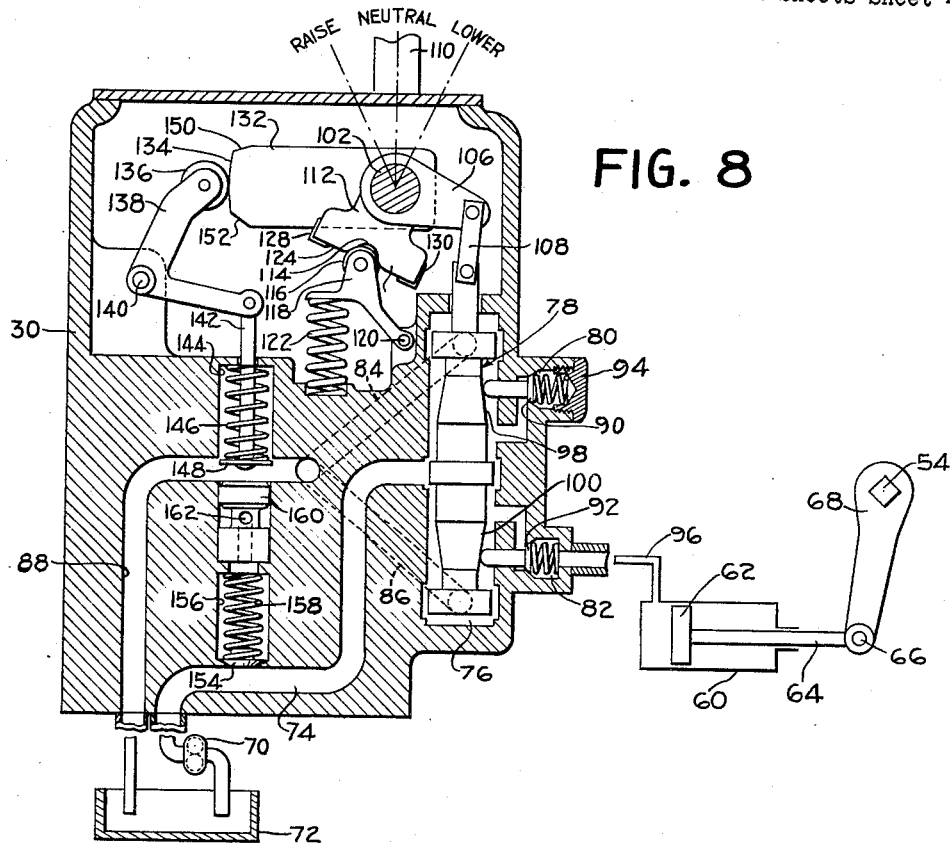
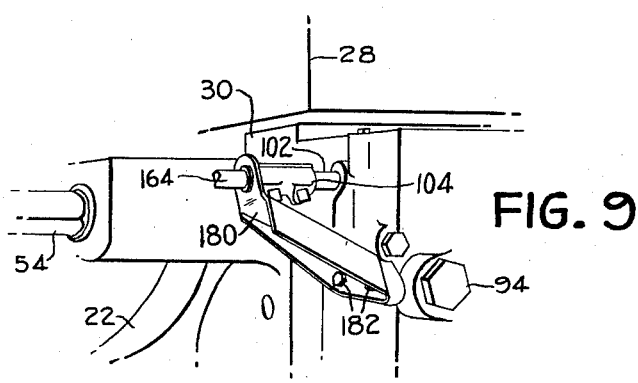
INVENTORS
J. G. LINDEMAN
R. D. KREHBIEL
ATTORNEYS United States Patent Office 2,708,906
Patented May 24, 1955

2,708,906

POSITION CONTROL MEANS FOR HYDRAULIC MECHANISM

Jesse G. Lindeman and Robert D. Krehbiel, Yakima, Wash., assignors to Deere & Company, Moline, Ill., a corporation of Illinois Application January 21, 1953, Serial No. 332,408

16 Claims. (Cl. 121—38)

This invention relates to hydraulic mechanism and more particularly to position-control means therefor.

The invention finds its greatest utility in the field of agricultural implements and tractors wherein, in a typical case, the tractor will include as standard or auxiliary equipment a power control means of the hydraulic type incorporating a valve selectively settable between neutral and active positions for immobilizing and mobilizing a work member that is in turn connected to an implement for adjusting the position of the implement. In the case of a plow or cultivator or other ground-working tool, it is desirable to select a ground-working depth for the tool and to return the tool to that depth after the tool has been raised, for one reason or another, such as at the end of the field in order to turn the tractor about. Since, in ordinary circumstances, the plowing or cultivating depth is less than the maximum range of movement of the hydraulically powered work member, means must be provided for returning the valve to neutral at an intermediate point in the range. This has previously been accomplished in several ways. In one case, the work member is equipped with a stop that may be set at the selected intermediate point and when this stop engages some rigid part, the work member can move no further; and, in those cases in which the power lift mechanism has a pressure-relief valve connected to the control valve, the end result is that the control valve is returned to neutral position. One disadvantage in this arrangement is that the stop, once set for any selected depth, must be reset for a new depth, which means that the original setting is destroyed. Another disadvantage is that a stop of this character normally requires that the operator dismount from the tractor to make the necessary adjustment.

In other cases, such as those exemplified by the disclosures in the patents to Brown Reissue 22,019 and 2,286,256 and Brown and Court 2,311,516, mechanical follow-up means has been utilized, comprising essentially linkage connected between the work member and the control lever, whereby, when the work member travels a predetermined distance, the linkage functions to return the control valve to neutral. The linkage has, of course, adjustable means therein so that the extent of movement of the work member can be varied. In these cases, as well as in the typical case mentioned above, a new adjustment essentially destroys the old adjustment. This defect becomes paramount when it is considered that very often a new adjustment is desired only temporarily.

According to the present invention, the designs previously referred to are improved to the extent that the previous adjustment may be maintained while yet incorporating provision for varying the extent of movement of the work member beyond that originally selected. Specifically, this object is accomplished by the provision of interengageable stops, one of which has associated therewith detent means that may be overriden by manual force exerted by the operator on the main control lever. In short, the detent means is so constructed and arranged as to normally operate as a driving connection between the moving work member and the actively positioned control lever, but which detent means has the characteristic enabling it to be overridden by manual force applied to the control lever as just outlined.

Another important object of the invention is to provide an attachment for power lift mechanisms of at least one well known type, whereby such mechanisms may be converted or modified without material alteration in the basic design. It is, of course, an object of the invention to create a design that lends itself to economy of manufacture and ease in attachment and use.

Briefly and specifically, these and other objects are achieved in a preferred embodiment of the invention in which the control lever that is connected to the rockshaft of the conventional structure of the type referred to is removed and replaced by the control attachment, which attachment comprises a pair of levers mounted on a rockshaft extension. The rockshaft extension has coupling means for connecting it to the original rockshaft for rocking of the two in unison. One of the levers is a control lever, and this is keyed to the rockshaft extension. The other lever is an auxiliary lever and is journaled on the rockshaft extension, as is a follow-up member having an arcuate peripheral portion in which is provided a notch of such circumferential length as to exceed the circumferential or angular thickness of a detent plunger carried by the auxiliary lever. The follow-up member is connectible to the work member so that it moves in response to movement of the work member. The two levers are adjustably interconnectible so that their angular relationship to each other may be varied. Normally, the adjusting means is set so that the two levers move in unison. The provision for angular adjustment between the two levers enables the position of the detent in the follow-up member notch to be varied. The length of the notch in the follow-up member enables the two levers to be moved relative to the follow-up member, the plunger riding within the notch. The fact that the plunger is in the form of a detent enables it to be forced out of the notch by manual effort applied to the control lever.

Various other objects and important features inherent in and encompassed by the invention will become apparent from the following disclosure of the invention as made in the specification and accompanying sheets of drawings in which Figure 1 is a side elevational view of a rear portion of a tractor-mounted implement in which the invention has been incorporated, the near wheel having been omitted to expose the control parts.

Figure 2 is an enlarged side elevational view of the components involved in the control, the full lines illustrating the neutral position of the control lever and the broken lines indicating one of the active positions of the control lever.

Figure 3 is a sectional view as seen substantially on the line 3—3 of Figure 2.

Figure 4 is a vieiw of the same components illustrated in Figure 2, with the exception that the broken lines illustrate the position of the control lever in another of its active positions.

Figure 5 is a similar view, showing other positions of the parts.

Figure 6 is a fragmentary sectional view taken on the line 6—6 of Figure 4.

Figure 7 is a fragmentary side elevational view showing the auxiliary lever moved to an inoperative position.

Figure 8 is a sectional view showing a representative hydraulic mechanism.

Figure 9 is a perspective view showing part of the means for mounting the control attachment on the tractor in association with the power lift mechanism.

The tractor-implement organization chosen for the purposes of illustration comprises a tractor having a longitudinal narrow body 20 that includes rear axle structure 22 from opposite sides of which project driving axles, only the left-hand one of which is visible at 24. These axles have respectively keyed thereto traction wheels, only the left-hand one of which is visible at 26. The tractor further includes a conventional operator's seat 28, below which is a housing or casing 30 within which is contained power lift mechanism of the general character disclosed in U. S. Patent No. 2,532,552, the fundamental components deemed necessary to an illustration of the present invention being illustrated herein in Figure 8, to which reference will be had subsequently.

The implement is shown as comprising a two-bottom plow having a plow beam 32 and plow bottoms 34 and 36. The forward end of the plow beam 32 is connected to a transverse carrier shaft 38 that forms part of a draft structure designated generally by the numeral 40. This structure by itself forms no part of the present invention, nor does the implement, these elements being illustrated solely for the purpose of satisfying the requirement that some implement be disclosed. Suffice it to say that the draft structure 40 includes a forwardly extending drawbar element 42 pivotally connected at its forward end at 44 to an under portion of the tractor body 20, whereby the implement and draft structure may be raised and lowered in order that the bottoms 34 and 36 may be raised clear of the ground or may be set in the ground at varying depths within the mechanical limits of the control mechanism to be hereinafter described.

The draft structure 40 is of the type having a mast 46 to the upper end of which is connected downwardly and rearwardly inclining bracing structure 48, which likewise is of little importance as far as the present invention is concerned. The mast 46 also has connected to its upper end a bail 50 which includes a pair of integral forwardly extending arms, only the left-hand one of which appears at 52.

The power lift housing or casing 30 has journaled therein a transverse rockshaft 54, opposite ends of which project respectively at opposite ends of the housing 30 for affixation to various types of implement-control elements. One such element is shown here, affixed to the left-hand end of the rockshaft 54 and comprising a control or lifting arm or member 56. This member is in turn connected by a pin 58 to the forward end of the left-hand bail arm 52. For all practical purposes, the member 56 and bail arm 52 may be considered to be a single member or element. Likewise of no moment is the fact that the arm 56 is duplicated at the other end of the rockshaft 54. Of importance only is the fact that rocking of the rockshaft 54 serves to raise and lower the implement from and to the ground, and additionally serves to adjust the working depth of the plow bottoms 34 and 36.

The rockshaft 54 is powered by a hydraulic motor comprising a cylinder 60 and a reciprocable piston 62. The piston has a rod 64 (Figure 8) connected at 66 to an arm 68 enclosed within the casing or housing 30 and fixed to an intermediate portion of the rockshaft 54. It will be seen that movement of the piston 62 to the right in Figure 8 (which, although schematic, corresponds to the disclosure in Figure 1) rocks the rockshaft 54 in a counterclockwise direction, which has the obvious effect of raising the implement. Movement of the piston 62 has obviously reverse effects.

Use will be made hereinafter and in the claims of the expression "work member." It will be observed that the piston 62, as well as the piston rod 64, rockshaft 54 and lift arm 56, satisfies the definition of a work member. In the preferred embodiment of the invention disclosed here, the follow-up or position-control connection is effected to the arm 56. But it will be perfectly obvious that a similar connection could be made to any of the members just mentioned. Accordingly, any one of these may be selected as the "work member" and the expression is therefore to be considered as representative and not limiting.

The representative form of hydraulic system shown schematically in Figure 8 is convertible for use as either a one-way or a two-way system. In the use made of the system here, one of the discharge portions from the valve casing is plugged so that the system operates as a one-way type. So far as the present invention is concerned, there are no fundamental differences between the single-acting and double-acting systems.

The system includes a pump 70 driven in any suitable manner from the tractor engine (not shown) as is conventional. This pump has its low side associated with a reservoir 72 and its high side connected by a high-pressure passage 74 to a vertical valve bore 76 in the housing or casing 30. A main control element in the form of a cylindrical valve 78 is axially shiftable in the bore 76 to control a pair of discharge ports 80 and 82 and a pair of reservoir or exhaust ports 84 and 86. The exhaust ports or passages converge to a single exhaust passage 88, which leads back, of course, to the reservoir 72.

The upper discharge port 80 is normally closed by a conventional check valve 90 and a similar relationship exists between the lower discharge port 82 and a check valve 92. The upper discharge port 80 is plugged at 94 and the lower discharge port is connected by a fluid-transmitting line 96 to the left-hand end of the cylinder 60. Since the system is single acting, the line 96 transmits fluid under pressure to the cylinder as well as transmitting return fluid from the cylinder to the reservoir via the passages outlined above. Shifting of the valve 78 upwardly from its position in Figure 8 connects the high-pressure passage 74 with the lower discharge port 82 and the pressure rise causes opening of the check valve 92 so that fluid under pressure is transmitted through the line 96 to the left-hand end of the cylinder 62, to result in movement of the piston 62 to the right, followed by rocking of the rockshaft 54 in a counter-clockwise direction. Such action results in raising the lift arm 56 and consequently raising the implement.

The upper portion of the valve 78 has thereon a ramp 98 for opening the upper check valve 90 but, since the discharge port 80 is plugged at 94, the result is immaterial. A symmetrically arranged ramp 100 at the lower portion of the valve 78 operates to open the lower check valve 92 when the valve 78 is moved downwardly. This function is important, since it connects the port 82 to the left-hand end of the cylinder 60 for receiving return fluid through the line 96, which fluid is circulated through the exhaust passages 86—88 to the reservoir 72 when the implement is lowered, the rockshaft 54 turning, of course, in a clockwise direction during this phase of the operation.

The valve 78 is under the manual control of the tractor operator by means of a transverse valve-operating rockshaft 102. This rockshaft is journaled in the housing or casing 30 and has its left-hand end projecting, as at 104, the importance of which will be designated below. The rockshaft carries within the housing 30 an operating arm 106 which is connected by appropriate linkage 108 to the upper end of the valve 78, so that rocking of the rockshaft 102 results in axial shifting of the valve 78. In the conventional embodiment of the hydraulic power system illustrated, the outer or projecting end 104 of the valve-operating rockshaft 102 has keyed thereto an operating lever that extends within convenient reach of an operator on the tractor seat 28. According to the present invention, the standard lever is removed and is replaced by a modified form of control lever 110. The details of this lever and its relationship to the position-control components will be described later. For the moment, it will suffice to indicate that the rockshaft 102 is controlled by some kind of lever, the neutral and "raise" and "lower" positions of which are indicated in Figure 8.

The valve-operating rockshaft 102 has additionally fixed thereto within the housing 30 a T-shaped plate 112 notched at its center at 114 to receive a roller 116 on a bell crank 118. This bell crank is pivoted at 120 to an interior portion of the housing or casing 30 and is biased by a spring 122 in such direction as to resiliently or yieldably maintain the roller 116 in the notch 114. However, when the rockshaft 102 is rocked in either direction, the roller 116 is caused to depart from the notch 114 and to ride along straight edge portions 124 and 126 of the plate 112. The plate has respectively at its opposite ends corner portions 128 and 130, each of which cooperates in detent fashion with the roller 116. For example, assuming that the rockshaft 102 is rocked in a counterclockwise direction (Figure 8) to an angular extent in which the lever 110 is just short of the "raise" position, the roller 116 will depart from the notch 114 and will ride along the straight edge portion 124 until it encounters the corner portion 128. During this limited range of movement, the valve 78 will be shifted upwardly less than its maximum and the volume of fluid transmitted through the line 96 to the motor 60 will be considerably less than maximum. This gives the system what may be called a slow-speed phase of operation.

However, the rockshaft 102 may be manually forced to its full "raise" position, at which time the roller 116 rides upon the corner portion 124, and in these circumstances the system delivers maximum volume and pressure. The operator is able to feel the point at which the roller 116 encounters the corner portion 124. Similar results obtain upon movement of the rockshaft 102 in the opposite direction, the roller 116 in this case cooperating with the opposite corner portion 130. These details are outlined in the above-mentioned U. S. Patent 2,532,552. At any point within the slow-speed range defined by the straight edge portions 124 and 126 of the plate 112, the spring-loaded roller 116 is capable of returning the valve 78 to a neutral position immediately upon release of the lever by the operator.

In addition to the plate 112, the rockshaft 102 has fixed thereto within the casing 30 an arm 132, the free end of which is arcuate at 134 to provide an edge on which a roller 136 normally rides. This roller is carried at the upper end of a bell crank 138 that is pivoted within the housing 30 at 140. The bell crank 138 has its second arm connected to the upper end of a rod 142. This rod extends downwardly through a cylindrical bore 144 within which is contained a compression spring 146 that acts on the headed end 148 of the rod, the net result being that the roller 136 is maintained in engagement with the arcuate edge 134 of the arm 132. The arcuate edge 134 terminates respectively at its opposite ends in cut-off corner portions 150 and 152. The arcuate length of the arcuate portion 134 corresponds to the angular movement of the rockshaft 102 between its two slow-speed positions. That is to say, when the rockshaft 102 is rocked to such an extent that the roller 116 just meets one of the corner portions 128 or 130 on the plate 112, the roller 136 is confined to the arcuate edge portion 134 on the arm 132. However, when the rockshaft is rocked further, so that the roller 116 rides up on one or the other of the corner portions 128 or 130 of the plate 112, the roller 134 will ride up on one of the corner portions 150 or 152 of the arm 132. The spring 122 that operates on the bell crank 118 is normally effective to return the rockshaft 102 to its neutral position (and likewise the valve 78) except for the temporary releasable locking action effected at either 136—150 or 136—152. However, in either case, manual effort applied to the control lever 110 will overcome the locking action at 136—150 or 136—152 to initiate return of the control valve to neutral.

The system includes a pressure-relief valve 154 carried in a vertical bore 156 coaxial with the bore 144 that contains the spring 146 and rod 142. The valve 154 is normally seated by a relief valve spring 158 so as to separate the bore 156 from the high-pressure passage 74. However, upon the occurrence of an unprecedented rise in pressure, the valve 154 is moved upwardly against the bias of the spring 158 and the pressure forces upwardly a second valve 160 which has therein a passage 162 thereupon connectible to the exhaust passage 88. At the same time, the second valve 160 contacts the headed end 148 of the rod 142 and forces the rod upwardly to cause counterclockwise rocking of the bell crank 138. In the event that the rockshaft 102 is set in either of its full "raise" or full "lower" positions, such rocking of the bell crank will result in release of the roller 136 from whichever corner portion 150 or 152 it had previously been in engagement, whereupon the spring 122 behind the bell crank 118 will cause the rockshaft to return to its neutral position and consequently will return the control valve 78 to its neutral position, thus relieving the system of substantially all pressure. Again, these particular details are covered in the U. S. Patent 2,532,552, referred to above, and are repeated only generally here for purposes of orientation. Equivalent systems could as well be employed with the present invention.

It was previously stated that the conventional control lever on the rockshaft 102 is replaced according to the present invention by the control lever 110. In the preferred embodiment of the invention, the additional control lever—or replacement control lever—is included in an attachment assembly capable of being installed on a conventional mechanism without any material alteration. Along these lines, the attachment includes an extension rockshaft 164 (Figure 3) positionable coaxially with the projecting end 104 of the standard rockshaft 102 and including means providing a coupling 166 for interconnecting the rockshaft 102 and rockshaft extension 164 for rocking in unison. The coupling shown here is of the clamp type and includes a pair of nut and bolt assemblies 168 for effecting the connection just referred to. The outer end of the rockshaft 102 is provided with a keyway 170 for receiving a key 172 to connect the rockshaft to the original lever. This key 172 and keyway 170 are utilized with the inner end of the coupling 166. The rockshaft extension 164 has an alinable keyway 174 and a second key 176 cooperates with this keyway and the coupling 166 to key the coupling to the rockshaft extension. The coupling 166 has a reduced outer end portion 178 which affords a bearing for supporting and journaling the coupling 166 in a support or bracket 180. This bracket is removably supported on the power lift casing 30 by cap screws 182 which, of course, effect a supporting connection to the tractor, the important point being that the outer end of the rockshaft assembly 102—164 is adequately supported.

The attachment control lever 110 has its lower end formed as a hub 184 that receives the free end of the rockshaft extension 164. A third key 186 is utilized to fix the control lever 110 to the rockshaft extension 164. A nut and bolt assembly 188 completes the connection of the hub 184 of the lever 110 to the rockshaft extension 164.

The control lever hub 184 has an outwardly extending cylindrical portion 190 that establishes a journal or bearing for the mounting of an auxiliary or second lever 192 and a follow-up member or element 194. Accordingly, the second lever 192 and follow-up member 194 have movement angularly relative to each other and also relative, at times, to the control lever 110. The follow-up member 194 has an integral depending arm portion 196 connectible to the work member 56 for movement in unison with the work member so as to rock on the axis of the rockshaft extension 164 in response to movement of the work member 56 as the implement is raised and lowered. It might be observed here that some confusion may exist relative to the presence of the two rockshafts 54 and 102—164. As used in the appended claims, the expression "rockshaft" refers to the valve-operating rockshaft 102.

The connection between the follow-up member arm 196 and the lift arm or work member 56 is effected by a somewhat J-shaped link 198 having its opposite ends pivotally connected respectively at 200 and 202 to the arm 196 and work member 56. There is no particular magic in the shape of the link 198, it being shaped as it is here merely to accommodate the lifting rockshaft 54 during certain phases of operation of the system.

A snap ring 204 is utilized at the end of the lever hub 184 to retain the second lever 192 and follow-up member 194 on the hub, thus giving the preferred design the characteristic of a unit attachment for purposes of modifying or converting existing power lift mechanisms, which, as stated above, is one of the important objects of the invention.

The upper portion of the follow-up member or element 194 is arcuate at 206, the arc being formed about the rockshaft extension axis as a center. The arcuate portion or edge 206 is interrupted by a recess or notch 208 having an appreciable angular or circumferential length, the opposite ends of the notch defining a pair of angularly spaced stops 210 and 212. The purpose of this notch and its associated stops will be immediately explained.

The second or auxiliary lever 192 has a main body portion recessed at 214 (Figure 6) to carry a cooperating stop means or member in the form of a plunger 216. This plunger is backed up by a compression spring 218. Thus, the plunger is in effect a detent means and the free end of the plunger is received in the notch 208, normally between the notch stops 210 and 212.

It will be seen from the description thus far that if the work member 56 imparts motion to the follow-up member 194, this motion will be transferred to the second lever 192 whenever either of the stops 210 or 212 engages the stop established by the detent or plunger 216. If that is true, then this motion will be transferred to the main control lever 110 if a driving connection is established between the lever 110 and the lever 192. Such a driving connection is in fact established by the present invention. This will now be described.

The control lever 110 has integral therewith a rearward extension 220 including a bearing 222 in radially spaced relation to the axis of the rockshaft extension 164. This bearing supports one end of an arcuate rod 224, the shape of which is defined on a radius about the axis of the rockshaft extension. The upper end of the second lever 192 is arcuately apertured at 226 to receive the rod 224, and clamping means is provided for adjustably fixing the position of the lever 192 relative to the rod 224. This clamping means takes the form of a threaded member 228 having at its outer end a knob 230 and at its inner end a reduced neck 232 bordered at opposite sides by annular shoulders 234 and 236 between which the rod 224 is received. As long as the knob 230 is tightened so that the conical shoulder 234 engages the rod 224, the two levers are interconnected for movement in unison and any motion transmitted by the follow-up member 194 to the lever 192 via the detent 216 is, of course, transmitted to the control lever 110 and results in movement of the control lever 110.

*Operation*

In the original setting or adjustment of the control parts for operation of the implement at a certain depth, the operator first loosens the knob 230 so as to free the levers 110 and 192 for relative movement. Then, by controlling the valve 78 via the control lever 110, he permits the plow bottoms 34 and 36 to enter the ground at a depth that he determines is proper in the circumstances. He then manually returns the control lever 110 to neutral, which, of course, restores the control valve 78 to neutral. Figure 1 shows the bottoms operating at an intermediate depth. Figure 2 shows, in full lines, the positions of the parts according to the setting of the implement in Figure 1. The extent of angular movement of the power rockshaft 54 may be coordinated by noting the three broken lines projecting radially from the axis of the rockshaft 54. These lines are designated respectively R, I and L, representing respectively raised, intermediate and lowered positions of the implement. Each line is based on an extension of a diagonal across the square section of the rockshaft 54 according to the position occupied by that rockshaft. In Figure 2, for example, the line I is an extension of the diagonal of the rockshaft when the rockshaft occupies a position in which the plow is plowing at an intermediate depth as shown in Figure 1.

As stated above, the first step in setting the control means is for the operator to return the control valve to neutral with the plow operating at the selected depth, the knob 230 having been previously loosened. The next step involves setting of the lever 192 so that the point of the detent or plunger 216 is centered in the notch 208, after which the knob 230 is tightened. This is the position shown in full lines in Figure 2 and this position will not be disturbed unless the operator desires to set the plow for a new plowing depth.

The tractor-implement unit proceeds to operate with the main control valve 78 in neutral and the bottoms 32 and 34 plowing at the selected depth, which depth will not change unless such change is deliberately effected by the operator. At the end of the field, the operator, desiring to raise the bottoms 32 and 34 so that he may turn the tractor about, moves the control lever 110 forwardly or in a counterclockwise direction as viewed in Figure 2, thus shifting the lever from its neutral to its "raise" position (broken lines in Figure 2). For effecting fast raise of the implement, maximum angular movement of the lever 110 will be achieved, which means that the roller 116 on the bell crank 118 within the housing 30 will ride up on the corner portions 128 of the rockshaft-attached plate 112. Likewise, the roller 136 in the housing-supported bell crank 138 will ride up on the corner portion 150 of the rockshaft-attached plate or arm 132. Accordingly, the control lever 110 will be releasably held in its raise position, as will the control valve 78, whereupon pressure rise in the valve bore 76 will open the lower check valve 92 to cause transmission of fluid under pressure through the line 96 to the left-hand end of the cylinder 60, thus extending the piston 62 and rocking the power rockshaft 54 in a counterclockwise direction and causing the lift arm or work member 56 to move in the same direction, which direction is represented in Figure 2 by the arrow A.

As the control lever 110 is shifted forwardly or to its raised position, taking along with it the connected lever 192, the detent 216 overrides the notch stop 210 and rides on the left-hand portion of the arcuate edge 206 of the follow-up member 194, as shown in broken lines in Figure 2. Thus, although the detent 216 is so constructed and arranged, or dimensioned relative to the notch 208, as to be capable of transmitting force from the follow-up member 194 to the interconnected levers 192 and 110, the detent is also capable of being manually overridden by force applied to the lever 110 by the operator when the operator desires to move the lever 110 in either one of its normal directions. Thus, no additional latches or secondarily controlled release means are needed, which materially increases the efficiency and economy of the design.

As the work member or lift arm 56 moves in the direction of the arrow A, the connecting point 202 between the work member 56 and the link 198 will move in the direction of the arrow B, resulting in clockwise movement of the followup member 194, or movement of the lower end thereof in the direction of the arrow C (all in Figure 2). Normally, the maximum raised position of the work member 56 will be the maximum stroke of the piston 62 as the piston moves from left to right as seen in Figure 8, whereupon the rockshaft 54 moves the angular distance between I and R. Since this is the end of the stroke of the piston 62, there will be an abnormal rise in pressure in the high-pressure passage 74, whereupon the relief valve 154 will be unseated, permitting fluid to raise the second valve 162 so as to trip the bell crank 138, releasing the roller 136 from the corner portion 150 of the arm 132. Following this, the spring-loaded bell crank 116 returns the control valve to neutral by forcing the rockshaft 102 back to its neutral position. Accordingly, the system will then function as usual in its neutral phase, merely circulating fluid back to the reservoir at no appreciable pressure. When the control valve lever 110 thus returns to its neutral position, it will occupy the full-line status shown in Figure 4, and the detent 216 will be just within the notch 208 and to the right of the notch stop 210. The work member or lift arm 56 and the power rockshaft 54 will occupy the positions in Figure 4, wherein it will be noted that the line R passes directly through the diagonal of the square section of the rockshaft 54.

Having turned the tractor and plow about, the operator may lower the plow bottoms to the plowing depth that they previously occupied. To do this, he moves the control lever 110 to its maximum "lower" position as shown in broken lines in Figure 4. Movement of the lever 110 to the position last indicated brings with it the lever 192 and the detent 216 occupies a position substantially midway between the notch stops 210 and 212 as shown. The control valve 78 will be shifted downwardly, and the ramp 110 opens the lower check valve 92 to permit fluid from the left-hand end of the cylinder 60 to return via the line 96 and exhaust passages 86 and 88 to the reservoir 72, the implement lowering by virtue of its own weight. As the work member or lift arm 56 moves downwardly or in a counterclockwise direction as represented by the arrow D in Figure 4, the connecting point 202 between the work member 56 and the follow-up link 198 moves in the direction of the arrow E, causing the lower end of the follow-up member 194 to move in the direction of the arrow F. This amounts to counterclockwise movement of the follow-up member 194 and the notch stop 212 will approach the detent 216 as the work member 56 approaches its previously selected position, a condition represented by the full-line positions of the parts in Figure 5. The driving force transmitted from the follow-up member 194 to the lever 192 via the detent 216 as engaged by the stop 212 is sufficient to overcome the releasable locking action of the roller 136 on the rockshaft-attached arm 132, whereupon the spring-loaded bell crank 116 returns the rockshaft 102 to its neutral position, bringing with it the main control valve 78. The neutral position of the control lever 110 as thus restored is indicated in broken lines in Figure 5. It will be observed that the broken-line position in Figure 5 corresponds to the full-line position in Figure 2, which emphasizes the fact that the parts are ultimately restored to their previously set positions.

If for some reason or other the operator desires to temporarily operate the plow at a depth below that previously set, he may do so by moving the control lever 110 again toward its "lower" position. If he desires to accomplish this result at slow speed, he may do so by moving the control lever 110 through an angular range consistent with the free angular movement permitted by the excess of angular or circumferential dimension of the notch 208 over the angular or circumferential thickness of the detent 216. Since the rockshaft 102 is always subject to the centering action of the spring 122 during this range, the operator may immediately release the control lever 110 and it will return to neutral position. Thus, the operator may effectively "nudge" the plow to a temporarily deeper position. If the operator desires to override the releasable engagement established at 212—216, he may do so, since as previously described, the spring-loading of the detent or plunger 216 is such that the detent means can be forcibly overcome or overridden. If the operator permits the plow to travel to its maximum depth (assuming that the tractor can pull it), the piston 62 will move its maximum distance to the left (Figure 8). However, since the system currently operates as a single-acting system, there will be no effect on the relief valve means 154—156—142 and the control lever will not be automatically returned to neutral. On the other hand, there are few, if any, circumstances in which the tractor-plow unit would be operated under the conditions just outlined.

Likewise, if the operator desires to decrease the plowing depth, he may move the control lever 110 forwardly from its full-line position of Figure 2 (or broken-line position of Figure 5) within the range permitted by the aforesaid excess in size of the notch 202 over that of the detent 216. Fully raising operation has been previously described and need not be repeated.

If at any time the operator desires to establish a new plowing depth, he may do so by releasing the knob 230, selecting the new depth by means of the main control lever 212, and resetting the angular relationship between the two levers 110 and 192 by centering the detent 216 in the notch 208 and again tightening the knob 230.

The automatic position control may be locked out or rendered inoperative as suggested in Figure 7, wherein it will be seen that the control knob 230 has been loosened and the lever 192 shifted in a counterclockwise direction to such an extent that the detent 216 escapes completely from the notch 208, after which the knob 230 is tightened on the rod 224. Stop means in the form of a snap ring 238 may be utilized to prevent departure of the lever 192 from the rod 224. In this inoperative setting of the second lever 192, the detent 216 is in such an angularly removed position from the stop 212 as to be incapable of being engaged by that stop, which relationship will be perfectly clear when it is considered that the stop 212 just engages the detent 216 as shown in Figure 5 on the basis of the setting of the lever 192 for an intermediate plowing depth. The situation may be otherwise comprehended by considering a shifting forward of the lever 192 from its full-line position in Figure 5 to approximately its broken-line position, which assumed shifting will be made, of course, without disturbing the full-line setting of the main control lever 110.

*Summary*

It will be seen from the foregoing that the invention provides not only an improvement in position-control or follow-up means but embodies also the use of the invention as an attachment for existing mechanisms. The design is simple and inexpensive and once installed is relatively easy to operate. The design permits wide flexibility, in that it enables adjustment within minimum and maximum ranges and further permits locking out the system or rendering it inoperative. Utmost advantage is taken of the existing characteristics of the hydraulic system with which the mechanism is associated, all of which contributes to the utility and success of the invention in its commercial embodiment.

The foregoing and other desirable features not specifically enumerated herein will undoubtedly occur to those versed in the art, as will numerous modifications and alterations in the preferred form of the invention disclosed, all of which may be achieved without departing

What is claimed is:

1. For an agricultural tractor having hydraulic implement control means including a movable work member connectible to an implement, and a valve casing including a projecting rockshaft connected to a valve that is selectively shiftable between a neutral position and an active position for respectively immobilizing and mobilizing the work member: a follow-up attachment for returning the valve to its neutral position from its active position in response to movement of the work member, comprising: a rockshaft extension positionable coaxially with the rockshaft and including coupling means for interconnecting the rockshaft and the extension for rocking in unison; a control lever keyed to the rockshaft extension; a follow-up element journaled on the rockshaft extension adjacent to the control lever and having an arm operatively connectible to the work member to move angularly in response to movement of the work member; an auxiliary lever journaled on the rockshaft extension adjacent to the control lever and the follow-up element; means for interconnecting the two levers for movement in unison, including selectively releasable and reengageable parts for setting the auxiliary lever in any one of a plurality of angular positions relative to the control lever; means on the follow-up element affording a stop; a spring-loaded detent on the auxiliary lever engageable with the stop and normally capable of establishing a connection between the follow-up element and the control lever via the auxiliary lever, said detent and stop being so constructed and dimensioned that the detent may override the stop by manual effort applied to rock the control lever.

2. The invention defined in claim 1, in which: the stop is formed by one end of a circumferential notch in the follow-up element, said notch being established about the rockshaft extension axis as a center and having such circumferential length relative to the circumferential thickness of the detent as to enable limited free angular movement of the interconnected levers relative to the follow-up member without overriding the detent.

3. The invention defined in claim 1, in which: the means interconnecting the two levers has provision for fixing the angular position of the auxiliary lever relative to the control such that the detent is clear of the stop.

4. The invention defined in claim 1, in which: auxiliary support means is provided for journaling the rockshaft extension on the tractor adjacent to the valve casing.

5. The invention defined in claim 1, in which: the coupling means includes a sleeve fixed at one end to the rockshaft extension and open at its other end to receive the projecting rockshaft.

6. For an agricultural tractor having hydraulic implement control means including a movable work member connectible to an implement, and a valve casing including a projecting rockshaft connected to a valve that is selectively shiftable between a neutral poistion and an active position for respectively immobilizing and mobilizing the work member; a follow-up attachment for returning the valve to its neutral position from its active position in response to movement of the work member, comprising: a rockshaft extension positionable coaxially with the rockshaft and including coupling means for interconnecting the rockshaft and the extension for rocking in unison; a control lever keyed to the rockshaft extension; a follow-up element journaled on the rockshaft extension adjacent to the control lever and having an arm operatively connectible to the work member to move angularly in response to movement of the work member; an auxiliary lever journaled on the rockshaft extension adjacent to the control lever and the follow-up element; means for interconnecting the two levers for movement in unison, including selectively releasable and reengageable parts for setting the auxiliary lever in any one of a plurality of angular positions relative to the control lever; means on the follow-up element affording a first stop; and means on the auxiliary lever affording a second stop engageable with the first stop for establishing a connection between the follow-up element and the control lever via the auxiliary lever.

7. The invention defined in claim 6, in which: the coupling means includes a sleeve fixed at one end to the rockshaft extension and open at its other end to receive the projecting rockshaft.

8. For an agricultural tractor having hydraulic implement control means including a movable work member connectible to an implement, and a valve casing including a projecting rockshaft connected to a valve that is selectively shiftable between a neutral position and an active position for respectively immobilizing and mobilizing the work member: a follow-up attachment for returning the valve to its neutral position from its active position in response to movement of the work member, comprising: a control lever having means for affixation to the projecting rockshaft; a follow-up element having means for the rockable mounting thereof on the tractor and including an arm operatively connectible to the work member to move angularly in response to movement of the work member; an auxiliary lever having means for the rockable mounting thereof on the tractor coaxially with and alongside the follow-up element; means for interconnecting the two levers for movement in unison, including selectively releasable and reengageable parts for setting the auxiliary lever in any one of a plurality of angular positions relative to the control lever; means on the follow-up element affording a stop; a spring-loaded detent on the auxiliary lever engageable with the stop and normally capable of establishing a connection between the follow-up element and the control lever via the auxiliary lever, said detent and stop being so constructed and dimensioned that the detent may override the stop by manual effort applied to rock the control lever.

9. The invention defined in claim 8, in which: the stop is formed by one end of a circumferential notch in the follow-up element, said notch being established about the axis of the follow-up member and auxiliary lever as a center and having such circumferential length relative to the circumferential thickness of the detent as to enable limited free angular movement of the interconnected levers relative to the follow-up member without overriding the detent.

10. The invention defined in claim 8, in which: the means interconnecting the two levers has provision for fixing the angular position of the auxiliary lever relative to the control such that the detent is clear of the stop.

11. For an agricultural tractor having hydraulic implement control means including a movable work member connectible to an implement, and a valve casing including a projecting rockshaft connected to a valve that is selectively shiftable between a neutral position and an active position for respectively immobilizing and mobilizing the work member: a follow-up attachment for returning the valve to its neutral position from its active position in response to movement of the work member, comprising: a control lever having means for affixation to the projecting rockshaft; a follow-up element having means for the rockable mounting thereof on the tractor and including an arm operatively connectible to the work member to move angularly in response to movement of the work member; an auxiliary lever having means for the rockable mounting thereof on the tractor coaxially with and alongside the follow-up element; means for interconnecting the two levers for movemnt in unison, including selectively releasable and reengageable parts for setting the auxiliary lever in any one of a plurality of angular positions relative to the control lever; a pair of stops, one on the follow-up element and the other on the auxiliary lever normally interengageable to establish a connection between the follow-up element and the control lever, one of the stops being spring-loaded and capable of overriding the other stop by manual force applied to rock the control lever.

12. In a device of the class described, the combination of a power-actuated movable work member, a control element associated therewith and shiftable from a neutral position to effect movement of the work member in a certain direction, a pair of stops, one associated with the control element and the other with the work member and interengageable in response to movement of the work member to return the control element to neutral and thus to limit the extent of movement of the work member to a certain terminal position; one of the stops being adjustable relative to the other to vary the point at which the stops will interengage and hence to vary the terminal position of the work member; and one of the stops including detent means providing for forcible overriding of one stop by the other by manual effort directed to shift the control element whereby the element may be shifted from its neutral position or be manually retained out of neutral position irrespective of the position of the work member.

13. In a device of the class described, the combination of a power-actuated movable work member, a control element associated therewith and shiftable from a neutral position to effect movement of the work member in a certain direction, a pair of stops, one associated with the control element and the other with the work member and interengageable in response to movement of the work member to return the control element to neutral and thus to limit the extent of movement of the work member to a certain terminal position; one of the stops being adjustable relative to the other to vary the point at which the stops will interengage and hence to vary the terminal position of the work member; and detent means associated with one of the stops to enable the control element to be manually shifted from its neutral position or be retained manually out of said neutral position for overriding the normal tendency of the work member to return the control element to neutral.

14. The invention defined in claim 1, in which: the means for interconnecting the two levers comprises an arcuate rod pivoted at one end to the control lever intermediate the ends of said lever and formed about the rockshaft extension axis as a center, said rod extending circumferentially adjacent to the auxiliary lever; said auxiliary lever having an aperture therethrough to loosely receive the rod; and means on the auxiliary lever selectively operative to engage and release the rod to enable variations in the angular relationship of the levers to each other about the bearing axis.

15. The invention defined in claim 6, in which: the means for interconnecting the two levers comprises an arcuate rod pivoted at one end to the control lever intermediate the ends of said lever and formed about the rockshaft extension axis as a center, said rod extending circumferentially adjacent to the auxiliary lever; said auxiliary lever having an aperture therethrough to loosely receive the rod; and means on the auxiliary lever selectively operative to engage and release the rod to enable variations in the angular relationship of the levers to each other about the bearing axis.

16. For an agricultural tractor having hydraulic implement control means including a movable work member connectible to an implement, and a valve casing including a projecting rockshaft connected to a valve that is selectively shiftable between a neutral position and an active position for respectively immobilizing and mobilizing the work member: a follow-up device for returning the valve to its neutral position from its active position in response to movement of the work member, comprising: a control lever having means for affixation to the projecting rockshaft; a follow-up element having means for the rockable mounting thereof on the tractor and including an arm operatively connectible to the work member to move angularly in response to movement of the work member; an auxiliary lever having means for the rockable mounting thereof on the tractor alongside the follow-up element; means connecting the two levers for movement in unison; means on the follow-up element affording a first stop; means on the auxiliary lever affording a second stop engageable with the first stop and normally capable of establishing a connection between the follow-up element and the control lever via the auxiliary lever, one of the stops including yielding means so constructed and dimensioned that one stop may override the other by manual effort applied to rock the control lever.

References Cited in the file of this patent

UNITED STATES PATENTS

| 1,040,337 | Hutchinson | Oct. 8, 1912 |
| 1,760,347 | Craig | May 27, 1930 |
| 1,791,469 | Maranda | Feb. 3, 1931 |
| 2,547,552 | Anderson | Apr. 8, 1951 |

FOREIGN PATENTS

| 2,488 | Great Britain | Aug. 21, 1872 |
| 592,832 | Great Britain | Sept. 30, 1947 |